Nov. 19, 1968     R. F. ZIMMERMAN     3,411,647

BOOM ASSEMBLY FOR TRACTOR LOADER

Filed Feb. 23, 1967     2 Sheets-Sheet 1

Inventor
Richard F. Zimmerman
By: Richard E. Backus Atty.

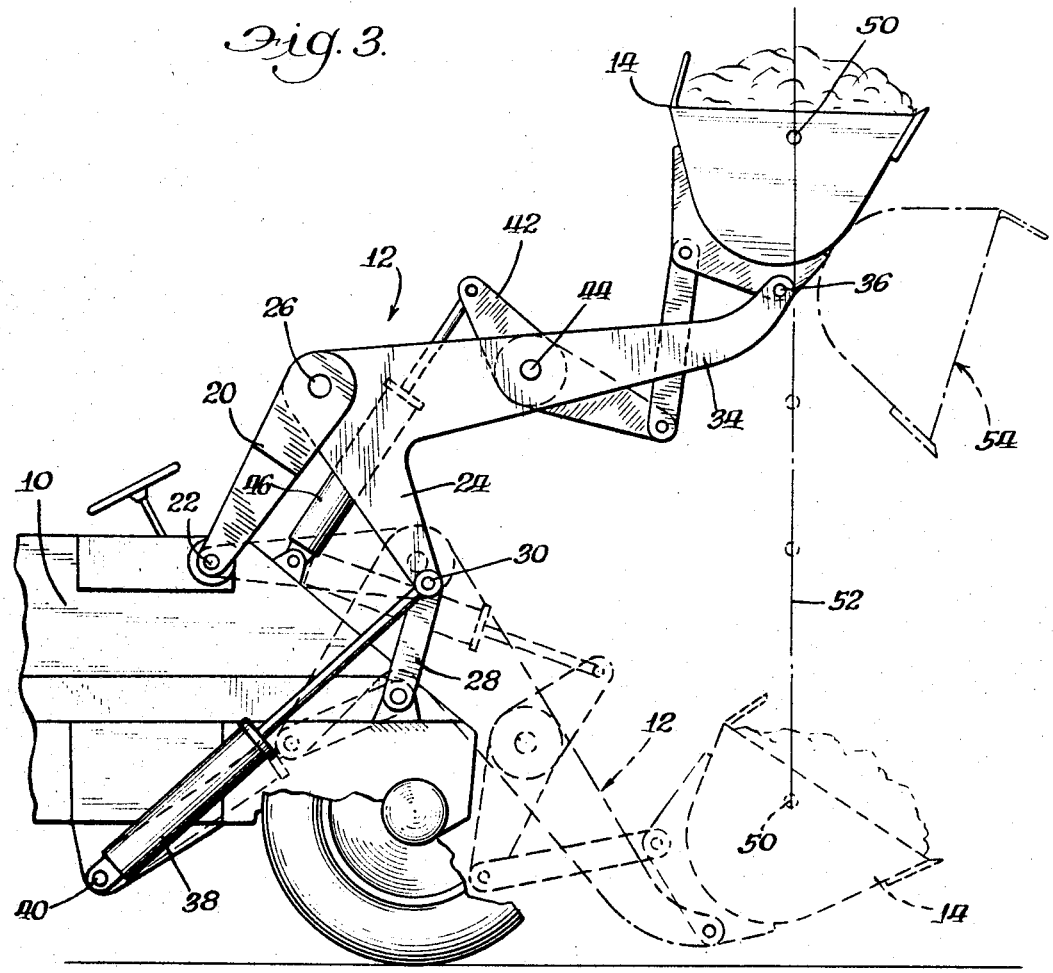

United States Patent Office 3,411,647
Patented Nov. 19, 1968

3,411,647
BOOM ASSEMBLY FOR TRACTOR LOADER
Richard F. Zimmerman, Waukegan, Ill., assignor to International Harvester Company, Chicago, Ill., a corporation of Delaware
Filed Feb. 23, 1967, Ser. No. 617,904
3 Claims. (Cl. 214—770)

ABSTRACT OF THE DISCLOSURE

A boom assembly for a tractor loader vehicle providing straight vertical lift for an implement and improved crowding characteristics through operation of the boom ram. The boom assembly incorporates a four-bar linkage in which the boom ram is connected in a toggle configuration with an arm of the linkage to achieve the improved lifting and crowding characteristics.

Background of the invention

The field of art to which this invention pertains is that of material handling implements for use with construction machinery. The boom assembly of this invention may be generally used with construction equipment such as front end tractor loaders.

Various prior art designs for boom assemblies have been proposed to achieve improved lifting characteristics for an implement. Among these is the patent to Hoar No. 2,538,000. In the Hoar design a bellcrank mechanism is utilized to achieve an approximate straight vertical lift for the bucket. However, this design does not afford crowding of the bucket through operation of the boom rams alone. Another boom assembly is that shown in the patent to Halls No. 3,215,292 in which a four-bar linkage interconnects the bucket with the loader frame. Again, this design does not achieve a simplified crowding operation. In the designs of Granryd No. 3,175,711 and Lull No. 2,753,060 a sequential operation of two separate boom rams is required to effect the straight vertical lift function of the loader.

Summary of the invention

This invention relates to a boom assembly incorporating a four-bar linkage in which an extensible hydraulic ram is connected in a toggle configuration with one of the linkage arms whereby extension and retraction of the ram raises and lowers the boom assembly so that an implement, such as a bucket, connected thereto is elevated along a substantially straight vertical path. Through operation of the four-bar linkage the bucket may be raised to a much higher elevation as compared to conventional loaders. With the boom assembly and bucket lowered in the digging position short reciprocating movements of the extensible boom ram operating through the toggle will effect a forward and upward crowding motion to the bucket without the need for separate operation of the bucket tilting mechanism. The operator may control this crowding motion through manipulation of a single operating lever, thus simplifying loader operation during a digging cycle.

Description of the drawings

FIGURE 3 is a side elevation view similar to FIGURE 1 illustrating in broken line view the boom assembly after roll-back of the bucket, and in full line view the boom assembly in the high lift position.

Description of the preferred embodiment

Figure 1:
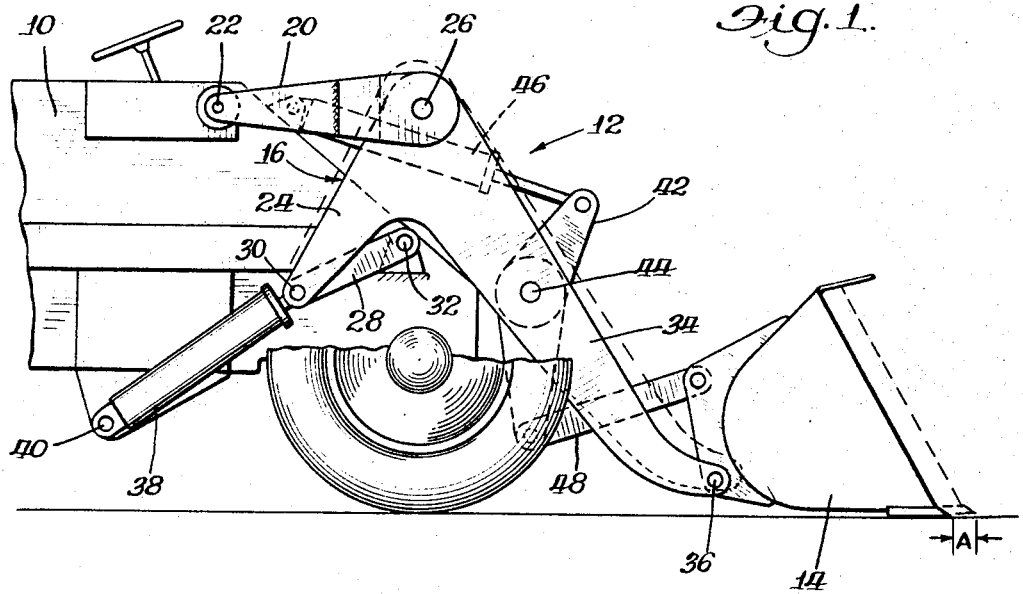
FIGURE 1 is a side elevation view, partially cut away for clarity, illustrating a tractor loader vehicle incorporating a boom assembly embodying features of the present invention.

Referring now to the drawings and particularly FIGURE 1 a front end loader vehicle according to the present invention is illustrated generally at 10. A boom assembly 12 is provided at the front of the vehicle to support an implement, such as digging bucket 14, for use in loading operations.

Figure 2:
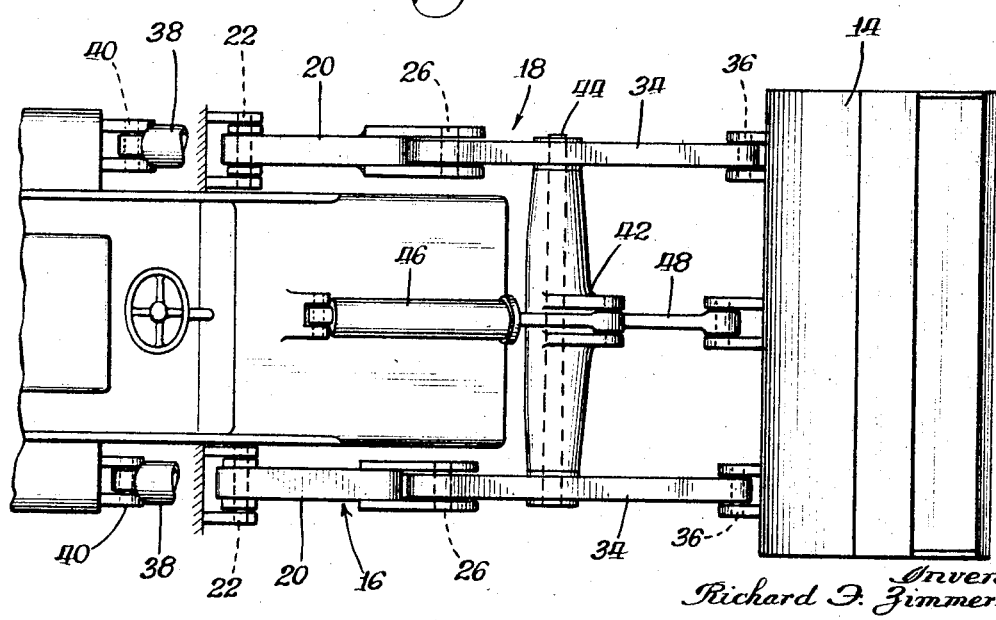
FIGURE 2 is a top plan view of the invention illustrated in FIGURE 1.

The boom assembly 12 comprises a pair of transversely spaced four-bar linkage assemblies 16 and 18 (FIGURE 2) sized and positioned to provide novel digging and loading characteristics. Linkage assembly 16 is representative and comprises a first arm 20 pivotally mounted at its rear end to the vehicle frame by means of pin 22, a second arm 24 pivotally mounted at its upper end to the forward end of arm 20 by means of pin 26, and a third arm 28 pivotally mounted at its rear end to the lower end of arm 24 by means of pin 30 and pivotally mounted at its upper end to the vehicle by means of pin 32. The first, second, and third arms, together with the frame of the vehicle itself, define the four bars of the linkage assembly. An elongated, forwardly extending support arm 34 is integral with the second arm 24 and pivotally supports at its forward end the bucket 14 by means of pin 36.

Operation of boom 12 is achieved through extension and retraction of an hydraulic ram 38 controlled by a conventional hydraulic system (not shown). The ram 38 is pivotally connected at its head end to the vehicle by means of pin 40 and at its rod end to the pin 30 at the interconnected ends of arms 24 and 28.

The attitude of bucket 14 is controlled by operation of a rocker arm 42 pivotally mounted between linkage assemblies 16 and 18 by means of pin 44. An extensible hydraulic ram 46, controlled by the operator through the hydraulic control system, is pivotally mounted at its head end to the vehicle and at its rod end to the upper end of arm 42. A control link 48 interconnects the lower end of arm 42 with the rear side of bucket 14. Extension and retraction of ram 46 will roll back and roll forward, respectively, bucket 14 with respect to ground level.

With ram 38 retracted and the boom lowered the longitudinal axes of the ram and arm 28 form a large included angle approaching 180°, which, in effect, defines a toggle linkage. As a result, short, reciprocating movements of ram 38 will pivot arm 28 through a relatively large angle, thereby multiplying the forward and upward displacement of bucket 14. As an example, with the boom in the lowered position illustrated in FIGURE 1, an extension of ram 38 in the order of approximately one inch will result in forward crowding of bucket 14 through the much larger distance A. The advantage to this is that the operator may effect a rapid crowding operation of the bucket into the material through operation of the boom rams alone. The need for either simultaneous operation of the rocker arm or forward and reversing of the vehicle is therefore reduced.

The invention further provides improved lifting characteristics during a loading cycle. With boom 12 in the lowered position and with the bucket loaded and operated to the roll-back position, as indicated in the broken line illustration of FIGURE 3, the center of gravity of the load will be approximatey at position 50. Extension of ram 38 will raise boom 12 and bucket 14 so that center of gravity 50 will follow the substantially vertical path 52. It is not necessary to operate bucket control ram 46 to achieve this straight vertical lift of the bucket. An advantage in the straight lift path arises where the loader vehicle is used to dump the load into an elevated truckbed, for example. Since the bucket does not swing in an arc as it is raised the loader vehicle may be positioned closer to the truckbed for the dumping operation, which is illustrated by position 54 in FIGURE 3. Moreover, improved vehicle stability is obtained since the center of gravity does not shift forward relative to the vehicle.

While the embodiment herein is at present considered to be preferred it will be understood that numerous variations and modifications may be made by those skilled in the art and it is intended to cover in the appended claims all such variations and modifications as fall within the true spirit and scope of the invention.

What is claimed is:

1. A boom assembly for supporting an implement on a tractor loader vehicle, the assembly comprising the combination of: a first arm pivotally mounted at its rear end to the vehicle; a second arm pivotally mounted at its rear end to the forward end of the first arm, the second arm further comprising a downwardly extending end and a forwardly extending support, the implement being mounted on the forward end of the support; a third arm pivotally connected at one end to the lower end of the second arm and at its other end to the vehicle; an extensible link pivotally connected at its rear end to the loader and at its forward end to the pivotal connection between said second and third arms, the extensible link forming, in its retracted position, a toggle linkage with the third arm whereby extension of the link pivots the third arm upward thereby raising the boom to elevate the implement along a substantially vertical path; and, means to pivot the implement relative to the support.

2. The invention as defined in claim 1 wherein the means to pivot the implement comprises a lever pivotally mounted to the support, an extensible link pivotally mounted between the vehicle and one end of the lever, the lever being connected with the implement for pivoting the implement relative to the support responsive to operation of the extensible link.

3. The invention as defined in claim 1 wherein the longitudinal axis of the retracted extensible link forms an included angle approaching 180° with respect to the longitudinal axis of the third arm.

References Cited

UNITED STATES PATENTS 3,215,292   11/1965   Halls _____ 214—770

HUGO O. SCHULZ, *Primary Examiner.*